(12) United States Patent
Coldicott et al.

(10) Patent No.: US 9,704,130 B2
(45) Date of Patent: Jul. 11, 2017

(54) STANDARD BASED MAPPING OF INDUSTRY VERTICAL MODEL TO LEGACY ENVIRONMENTS

(75) Inventors: Peter A. Coldicott, Leander, TX (US); Eoin Lane, Littleton, MA (US)

(73) Assignee: International Business Machines Corporation, Armonk, NY (US)

( * ) Notice: Subject to any disclaimer, the term of this patent is extended or adjusted under 35 U.S.C. 154(b) by 2169 days.

(21) Appl. No.: 12/605,635

(22) Filed: Oct. 26, 2009

(65) Prior Publication Data
US 2011/0099139 A1     Apr. 28, 2011

(51) Int. Cl.
| G06F 17/00 | (2006.01) |
| G06Q 10/10 | (2012.01) |
| G06Q 10/06 | (2012.01) |
| G06F 17/30 | (2006.01) |

(52) U.S. Cl.
CPC ............. *G06Q 10/10* (2013.01); *G06Q 10/06* (2013.01); *G06F 17/30* (2013.01)

(58) Field of Classification Search
None
See application file for complete search history.

(56) References Cited

U.S. PATENT DOCUMENTS

| 6,256,773 B1 | 7/2001 | Bowman-Amuah |
| 6,539,396 B1 | 3/2003 | Bowman-Amuah |
| 6,658,644 B1 | 12/2003 | Bishop et al. |
| 6,799,174 B2 | 9/2004 | Chipman et al. |
| 7,080,064 B2 | 7/2006 | Sundaresan |
| 7,099,859 B2 | 8/2006 | Sundaresan |
| 7,103,871 B1 | 9/2006 | Kirkpatrick et al. |
| 7,225,241 B2 | 5/2007 | Yada |
| 7,318,055 B2 | 1/2008 | Britton et al. |
| 7,366,706 B2 | 4/2008 | Chang et al. |

(Continued)

FOREIGN PATENT DOCUMENTS

WO    2007113164    10/2007

OTHER PUBLICATIONS

Bieberstein, Norbert, Robert G. Laird, and Keith Jones. Executing SOA: a practical guide for the service-oriented architect. IBM Press, 2008.*

(Continued)

*Primary Examiner* — Paulinho E Smith
(74) *Attorney, Agent, or Firm* — Brown & Michaels, PC; Isaac Gooshaw

(57) ABSTRACT

A standard based mapping of industry vertical models to legacy environments to suggest points of enterprise application integration. A representation of a first domain comprising industry model instance data is generated in a standard-based format from an enterprise industry model. A representation in the standard-based format of a second domain comprising legacy data is generated from the legacy environment. A set of inference rules is applied against the representation of enterprise industry model instance data and the representation of legacy data. One or more candidate legacy assets in the representation of legacy data capable of implementing an aspect of the enterprise industry model are identified. The identified one or candidate legacy assets for implementing the aspect of the enterprise industry model are then recommended to a user.

20 Claims, 9 Drawing Sheets

(56) References Cited

U.S. PATENT DOCUMENTS

| | | | |
|---|---|---|---|
| 7,412,457 B2 | 8/2008 | Saracco et al. | |
| 7,483,973 B2 | 1/2009 | An et al. | |
| 7,526,501 B2 | 4/2009 | Albahari et al. | |
| 7,546,295 B2 | 6/2009 | Brave et al. | |
| 7,890,517 B2 | 2/2011 | Angelo et al. | |
| 7,979,840 B2 | 7/2011 | Zhang et al. | |
| 2002/0069102 A1 | 6/2002 | Vellante et al. | |
| 2002/0073106 A1 | 6/2002 | Parker et al. | |
| 2002/0194053 A1 | 12/2002 | Barrett et al. | |
| 2003/0009740 A1 | 1/2003 | Lan | |
| 2003/0177481 A1* | 9/2003 | Amaru et al. | 717/148 |
| 2003/0233631 A1 | 12/2003 | Curry et al. | |
| 2004/0172612 A1 | 9/2004 | Kasravi et al. | |
| 2004/0193476 A1 | 9/2004 | Aerdts | |
| 2005/0050311 A1 | 3/2005 | Joseph et al. | |
| 2005/0050549 A1 | 3/2005 | Joseph et al. | |
| 2005/0138113 A1 | 6/2005 | Brendle et al. | |
| 2005/0166178 A1 | 7/2005 | Masticola et al. | |
| 2005/0278202 A1 | 12/2005 | Broomhall et al. | |
| 2006/0015489 A1 | 1/2006 | Probst et al. | |
| 2006/0047810 A1 | 3/2006 | Herzog et al. | |
| 2006/0053174 A1* | 3/2006 | Gardner et al. | 707/203 |
| 2006/0070083 A1 | 3/2006 | Brunswig et al. | |
| 2006/0174222 A1 | 8/2006 | Thonse et al. | |
| 2006/0229896 A1 | 10/2006 | Rosen et al. | |
| 2006/0236307 A1 | 10/2006 | Debruin et al. | |
| 2006/0241931 A1 | 10/2006 | Abu el Ata et al. | |
| 2007/0073663 A1 | 3/2007 | McVeigh et al. | |
| 2007/0106629 A1* | 5/2007 | Endacott et al. | 706/47 |
| 2007/0112712 A1 | 5/2007 | Flinn et al. | |
| 2007/0179983 A1* | 8/2007 | Putman | 707/200 |
| 2007/0239768 A1 | 10/2007 | Quinn-Jacobs | |
| 2007/0261027 A1 | 11/2007 | Dhanakshirur et al. | |
| 2007/0271277 A1 | 11/2007 | Ivan et al. | |
| 2008/0059630 A1 | 3/2008 | Sattler et al. | |
| 2008/0114700 A1 | 5/2008 | Moore et al. | |
| 2008/0126397 A1 | 5/2008 | Alexander et al. | |
| 2008/0127047 A1 | 5/2008 | Zhang et al. | |
| 2008/0133558 A1 | 6/2008 | Carlson et al. | |
| 2008/0134137 A1 | 6/2008 | Petersen | |
| 2008/0178147 A1 | 7/2008 | Meliksetian et al. | |
| 2008/0215358 A1 | 9/2008 | Goldszmidt et al. | |
| 2008/0215400 A1 | 9/2008 | Ban et al. | |
| 2008/0229195 A1 | 9/2008 | Brauel et al. | |
| 2008/0270372 A1 | 10/2008 | Hsu et al. | |
| 2008/0288944 A1 | 11/2008 | Coqueret et al. | |
| 2009/0064087 A1 | 3/2009 | Isom | |
| 2009/0077043 A1 | 3/2009 | Chang et al. | |
| 2009/0089078 A1 | 4/2009 | Bursey | |
| 2009/0109225 A1 | 4/2009 | Srivastava et al. | |
| 2009/0112908 A1 | 4/2009 | Wintel et al. | |
| 2009/0132211 A1 | 5/2009 | Lane et al. | |
| 2009/0138293 A1 | 5/2009 | Lane et al. | |
| 2009/0158237 A1 | 6/2009 | Zhang et al. | |
| 2009/0182610 A1 | 7/2009 | Palanisamy et al. | |
| 2009/0182750 A1 | 7/2009 | Keyes et al. | |
| 2009/0193057 A1 | 7/2009 | Maes | |
| 2009/0193432 A1 | 7/2009 | McKegney et al. | |
| 2009/0201917 A1 | 8/2009 | Maes et al. | |
| 2009/0204467 A1 | 8/2009 | Rubio et al. | |
| 2009/0210390 A1 | 8/2009 | Lane | |
| 2010/0082387 A1 | 4/2010 | Cao et al. | |
| 2010/0106656 A1 | 4/2010 | Sheth et al. | |
| 2010/0161629 A1 | 6/2010 | Palanisamy et al. | |
| 2010/0228693 A1* | 9/2010 | Dawson et al. | 706/12 |
| 2010/0269099 A1* | 10/2010 | Yoshimura et al. | 717/122 |
| 2011/0035391 A1 | 2/2011 | Werner et al. | |
| 2011/0153292 A1 | 6/2011 | Lane et al. | |
| 2011/0153293 A1 | 6/2011 | Coldicott et al. | |
| 2011/0153608 A1 | 6/2011 | Lane et al. | |
| 2011/0153610 A1 | 6/2011 | Carrato et al. | |
| 2011/0153767 A1 | 6/2011 | Coldicott et al. | |
| 2011/0238610 A1 | 9/2011 | Lee et al. | |

OTHER PUBLICATIONS

Pepper, Steve. "The TAO of topic maps." Proceedings of XML Europe. vol. 3. 2000.*

Hatzigaidas, Athanasios, et al. "Topic Map Existing Tools: A Brief Review." ICTAMI 2004 (International Conference on Theory and Applications of Mathematics and Informatics). 2004.*

Le Grand, Bénédicte, and Michel Soto. "Visualisation of the semantic web: Topic Maps Visualisation." Information Visualisation, 2002. Proceedings. Sixth International Conference on. IEEE, 2002.* van den Heuvel, Willem-Jan, Mike Papazoglou, and Manfred A. Jeusfeld. "Configuring business objects from legacy systems." Advanced Information Systems Engineering. Springer Berlin Heidelberg, 1999.*

Ryan, Kevin, and Brian Mathews. "Matching conceptual graphs as an aid to requirements re-use." Requirements Engineering, 1993., Proceedings of IEEE International Symposium on. IEEE, 1993.*

Wilde, Norman, et al. "A comparison of methods for locating features in legacy software." Journal of Systems and Software 65.2 (2003): 105-114.*

Heckel, Reiko, et al. "Architectural transformations: From legacy to three-tier and services." Software Evolution. Springer Berlin Heidelberg, 2008. 139-170.*

Papazoglou, Mike P., and Willem-Jan van den Heuvel. "Configurable business objects for building evolving enterprise models and applications." Business Process Management. Springer Berlin Heidelberg, 2000. 328-344.*

Building SOA applications with reusable assets, Part 1: Reusable assets, recipes, and patterns, "http://www.microsofttranslator.com/BV.aspx?ref=IE8Activity&a=http%3A%2F%2Fwww.ibm.com%2Fdeveloperworks%2Fcn%2Fwebservices%2Fws-soa-re-use1%2".

Building SOA applications with reusable assets, Part 2: SOA recipe reference example, "http://www.microsofttranslator.com/BV.aspx?ref=IE8Activity&a=http%3A%2F%2Fwww.ibm.com%2Fdeveloperworks%2Fcn%2Fwebservices%2Fws-soa-reuse2%2F".

Building SOA applications with reusable assets, Part 3: WS response template pattern, "http://www.microsofttranslator.com/BV.aspx?ref=IE8Activity&a=http%3A%2F%2Fwww.ibm.com%2Fdeveloperworks%2Fcn%2Fwebservices%2Fws-soa-reuse3%2F".

"System and Method for Distributed Web Service Adaptation using Aspect oriented Programming", IBM Technical Disclosure Bulletin, Sep. 15, 2008, pp. 1-3.

Baum et al., "Mapping Requirements to Reusable Components using Design Spaces", 2000, Proceedings 4th International Conference on Requirements Engineering, pp. 159-167.

Hsiung et al., "VERTAF: An Application Framework for the Design and Verification of Embedded Real-Time Software", IEEE Transactions on Software Engineering, vol. 30, No. 10, Oct. 2004, pp. 656-674.

Robinson et al., "Finding Reusable UML Sequence Diagrams Automatically", IEE Software, 2004, pp. 60-67.

Jin et al., "Automated Requirements Elicitation: Combining a Model-Driven Approach with Concept Reuse", International Journal of Software Engineering and Knowledge Engineering, vol. 13, No. 1, 2003, pp. 53-82.

Chen, D-W. et al.; "A P2P based Web service discovery mechanism with bounding deployment and publication", Chinese Journal of Computers; vol. 28; No. 4; pp. 615-626; Apr. 2005.

Lee, J. et al.; "Semantic and Dynamic Web Service of SOA based Smart Robots using Web 2.0 Open API", 2008; Sixth International Conference on Software Engineering, Research, Management, and Application; pp. 255-260.

Demirkan, H. et al.; "Service-oriented technology and management: Perspectives on research and practice for the coming decade"; Electronic Commerce Research and Applications vol. 7 Issue 4; Jan. 2008; pp. 356-376.

Zdun, U. et al.; "Modeling Process-Driven and Service-Oriented Architectures Using Patterns and Pattern Primitives"; ACM Transactions on the Web; vol. 1 No. 3 Article 14; Sep. 2007; 44 pages.

(56) References Cited

OTHER PUBLICATIONS

Simoes, B. et al.; "Enterprise-level Architecture For Interactive Web-based 3D Visualization of Geo-referenced Repositories"; Association for Computing Machinery Inc. 978-1-60558-432-4/09/0006; Jun. 2009; pp. 147-154.

Kanakalata et al; Performance Opitimization of SOA based AJAX Application; 2009; pp. 89-93.

Annett et al.; "Building Highly-Interactive, Data-Intensive, REST Applications: The Invenio Experience"; 2008; pp. 1-15.

Arnold et al.; "Automatic Realization of SOA Deployment Patterns in Distributed Environments"; ICSOC 2008; LNCS 5364; 2008; pp. 162-179.

U.S. Appl. No. 12/605,660, filed Oct. 26, 2009, Coldicott et al.

U.S. Appl. No. 12/605,562, filed Oct. 26, 2009, Coldicott et al.

Justin Kelleher, "A Reusable Traceability Framework Using Patterns", University of Cape Town, ACM Digital Library, 2005, pp. 50-55.

Sharples et al., "The Design and Implementation of a Mobile Learning Resource", Educational Technology Research Group, University of Birmingham, ACM Digital Library, 2002, pp. 1-23.

Min Luo, "Tutorial 1: Common Business Components and Services Toward More Agile and Flexible Industry Solutions and Assets", 2008 IEEE Congress on Services Part II, pp. 11-12.

Ying Huang et al., "A Stochastic Service Composition Model for Business Integration", Proceeds of the International Conference on Next Generation Web Services Practices, 2005 IEEE Computer Society, pp. 1-8.

Pham et al., "Analysis of Visualisation Requirements for Fuzzy Systems", 2003 ACM, pp. 181-187.

\* cited by examiner

STANDARD BASED MAPPING OF INDUSTRY VERTICAL MODEL TO LEGACY ENVIRONMENTS

BACKGROUND

1. Field

The present invention relates generally to an improved data processing system and more specifically to a computer implemented method, system, and computer usable program code for mapping industry vertical models to legacy environments in a standard format to suggest points of enterprise application integration.

2. Description of the Related Art

The use of service-oriented architecture (SOA) environments and information services is fast becoming the preferred implementation for enterprise systems. Using SOA, an enterprise may be visualized as a collection of loosely coupled building blocks, called information services or business services. Information services provide a discrete business function, such as, for example, checking credit, opening an account, and so on, that can be adapted to a particular business context. As a business expands its enterprise capabilities, more information services are added to the network to accommodate the expansion.

In almost every instance where new information services are developed to support a set of business needs today, there is a set of existing custom built applications, software packages, middleware, operating systems and hardware components that have to be understood and at least integrated with the new services. These existing software and hardware components are known as "legacy" components. A legacy environment comprises components that have been inherited from languages, platforms, and techniques earlier than current technology. The process of integrating new services into an environment comprising legacy components is known as a "brownfield deployment". The term "brownfield deployment" is taken from the building industry, where undeveloped land is described as "greenfield" and previously developed land is described as "brownfield". A "greenfield deployment" describes a deployment in which applications are built in a "clean" environment with no existing components to consider.

Large organizations often continue to operate in a legacy environment because it is cost prohibitive for the organization to move to a completely new platform. A focus of IT professionals in these organizations is on the mining of data about the existing (legacy) components in the system to discover all of the legacy components and the relationships among them, as well as the automation of this data mining. This data mining is necessary as many components undergo modifications and upgrades over time, often without the associated documentation being updated. In addition, with the start of the retirement of the "baby boom" generation, industries are losing many of the only people with any detailed knowledge of these legacy components. These legacy environments are extremely complex with thousands of different components and represent significantly more complexity than any single, or even small team of, IT professional can retain in their head. Consequently, there is an emerging and urgent need to find a way to organize and visualize the information gathered through these mining efforts.

SUMMARY

The illustrative embodiments provide a standard based mapping of industry vertical models to legacy environments to suggest points of enterprise application integration. A representation of a first domain comprising industry model instance data is generated in a standard-based format from an enterprise industry model. A representation in the standard-based format of a second domain comprising legacy data is generated from the legacy environment. A set of inference rules is applied against the representation of enterprise industry model instance data and the representation of legacy data. One or more candidate legacy assets in the representation of legacy data capable of implementing an aspect of the enterprise industry model are identified. The identified one or candidate legacy assets for implementing the aspect of the enterprise industry model are then recommended to a user.

DETAILED DESCRIPTION

Figure 1:
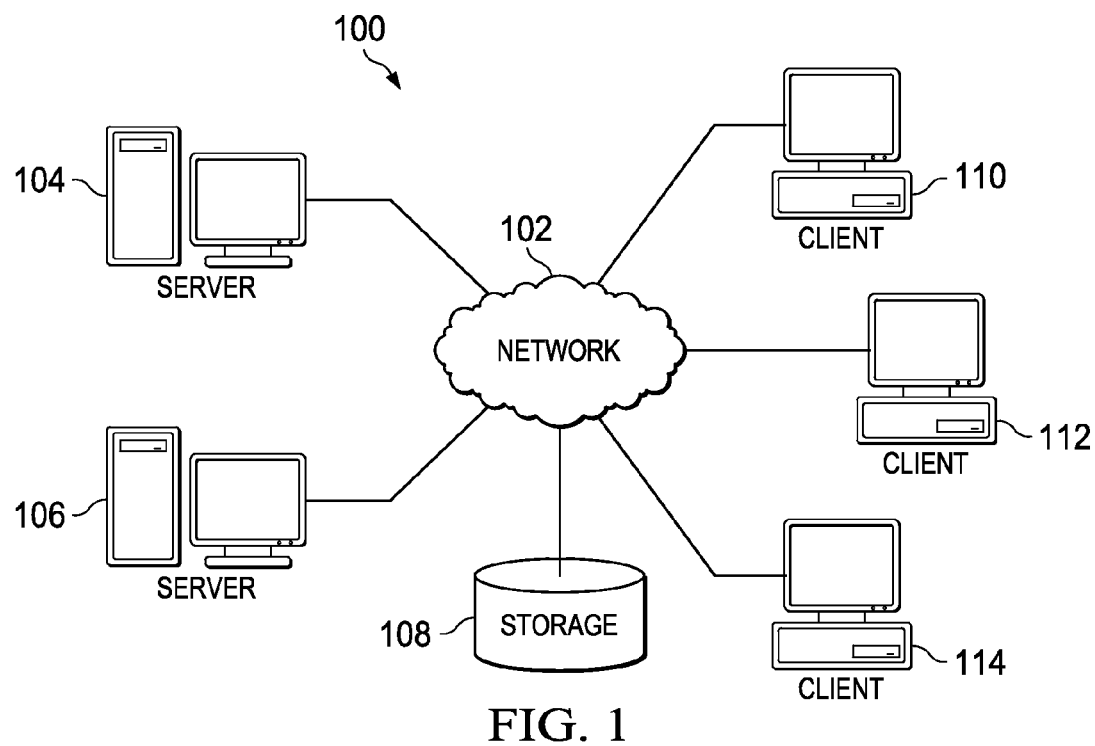
FIG. 1 is a pictorial representation of a network of data processing systems in which illustrative embodiments may be implemented.

As will be appreciated by one skilled in the art, aspects of the disclosure may be embodied as a system, method or computer program product. Accordingly, aspects of the disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the disclosure are described below with reference to flowchart illustrations and/or block diagrams of methods, apparatus (systems) and computer program products according to embodiments of the disclosure. It will be understood that each block of the flowchart illustrations and/or lock diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
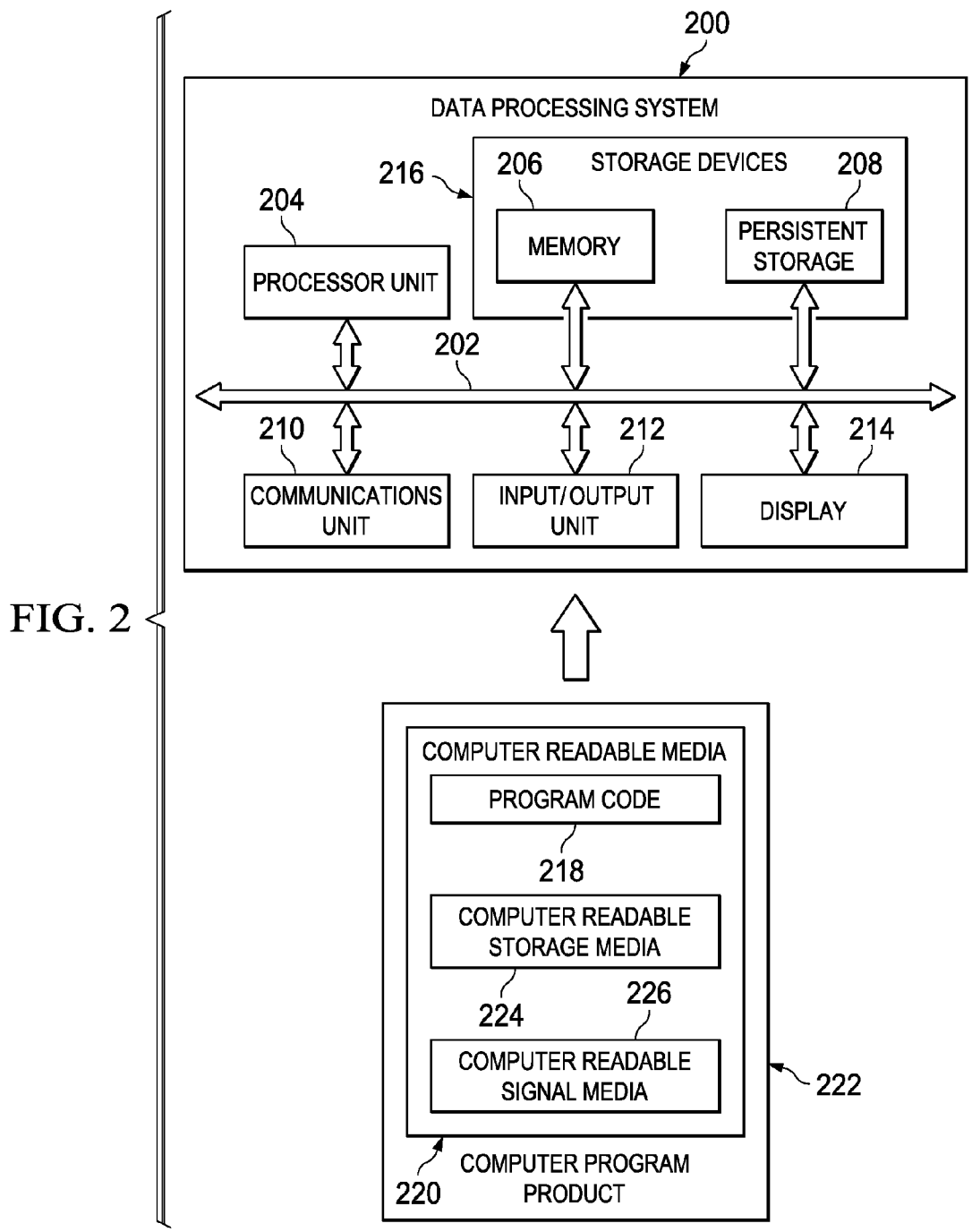
FIG. 2 is a diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides information, such as boot files, operating system images, and applications to clients 110, 112, and 114. Clients 110, 112, and 114 are clients to server 104 in this example. Network data processing system 100 may include additional servers, clients, and other devices not shown.

Program code located in network data processing system 100 may be stored on a computer recordable storage medium and downloaded to a data processing system or other device for use. For example, program code may be stored on a computer recordable storage medium on server 104 and downloaded to client 110 over network 102 for use on client 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a diagram of a data processing system is depicted in accordance with an illustrative embodiment. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example, without limitation, data, program code in functional form, and/or other suitable information either on a temporary basis and/or a permanent basis. Memory 206, in these examples, may be, for example, a random access memory, or any other suitable volatile or non-volatile storage device. Persistent storage 208 may take various forms, depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

Communications unit 210, in these examples, provides for communication with other data processing systems or devices. In these examples, communications unit 210 is a network interface card. Communications unit 210 may provide communications through the use of either or both physical and wireless communications links.

Input/output unit 212 allows for the input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be located in storage devices 216, which are in communication with processor unit 204 through communications fabric 202. In these illustrative examples, the instructions are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code, in the different embodiments, may be embodied on different physical or computer readable storage media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222. In one example, computer readable media 220 may be computer readable storage media 224 or computer readable signal media 226. Computer readable storage media 224 may include, for example, an optical or magnetic disc that is inserted or placed into a drive or other device that is part of persistent storage 208 for transfer onto a storage device, such as a hard drive, that is part of persistent storage 208. Computer readable storage media 224 also may take the form of a persistent storage, such as a hard drive, a thumb drive, or a flash memory that is connected to data processing system 200. In some instances, computer readable storage media 224 may not be removable from data processing system 200.

Alternatively, program code 218 may be transferred to data processing system 200 using computer readable signal media 226. Computer readable signal media 226 may be, for example, a propagated data signal containing program code 218. For example, computer readable signal media 226 may be an electro-magnetic signal, an optical signal, and/or any other suitable type of signal. These signals may be transmitted over communications links, such as wireless communications links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communications links or wireless transmissions containing the program code.

In some illustrative embodiments, program code 218 may be downloaded over a network to persistent storage 208 from another device or data processing system through computer readable signal media 226 for use within data processing system 200. For instance, program code stored in a computer readable storage media in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208, and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

As previously mentioned, legacy environments can be extremely complex with thousands of different components. Although IT professionals currently use data mining processes to gather information about legacy components and the relationships among them, it is often difficult for users to be able to visualize such complex systems. The illustrative embodiments provide a solution to this problem by using a canonical data model approach to organize information gathered through the legacy environment mining efforts. In enterprise application integration, a canonical data model is a design pattern used to communicate between different data formats. The organized information gathered through the legacy environment mining efforts is represented in a standard (canonicalized) data format, such as the topic map open standard. A topic map conveys knowledge about resources through a superimposed layer, or map, of the resources. The topic map ISO standard is formally known as ISO/IEC 13250:2003. The illustrative embodiments facilitate the comprehension and usage of legacy data by representing the collected data in a standard data format and by using topic maps to enable users to visualize a brownfield domain comprising legacy components and their interrelationships.

The illustrative embodiments also allow for mapping industry vertical models to legacy environments in a standard data format to suggest points of enterprise application integration. An enterprise industry model is an industry-specific, comprehensive enterprise model incorporating current industry best-practices with data model technology. Industry models address the unique requirements of a business operating in a particular industry and include industry-standard vocabulary to enable an organization to communicate with others in the industry. Enterprise legacy environment data comprises legacy data gathered through the legacy environment mining efforts. The enterprise industry model instance data and the enterprise legacy environment data are each represented in a common standard based format, such as the topic map standard. The illustrative embodiments use inference rules to automatically suggest a mapping of the legacy environment assets that may be used to provision the instantiation of the industry model(s). In other words, a legacy application may be identified as candidate asset that may be used to implement an aspect of the industry model. The mapping between legacy assets in the topic map of the enterprise legacy data and elements in the topic map of the enterprise industry model instance data is used to suggest points of enterprise application integration and enable the enterprise architect to strategically determine where to maximize investment. Thus, the reuse of legacy applications to implement an industry model may reduce costs associated with integrating current industry standards into the legacy system. In addition, by representing the recommended integration information in a standard format, the integration information may also be reused by other enterprises in similar industry verticals.

The illustrative embodiments provide an advantage over existing enterprise integration methodologies in that the illustrative embodiments provide an improved way for a user to visualize and navigate a connected web of enterprise legacy information using topic maps. Users may navigate through the relationship links, see patterns in the connections, and determine where existing legacy components may be reused to provision aspects of current industry standards, and where new applications are required to adhere to the industry standards. Representing enterprise legacy data using in the standard data format of topic maps allows the user to see detailed local information, and also visualize how that information fits into a broader global context. While each individual repository of industry and legacy data may effectively organize and categorize its own information, the illustrative embodiments enable relationships of topics across disconnected repositories to be inferred, thereby informing users of how the repository data is interconnected and allowing users to ask more meaningful questions based upon large repositories of knowledge.

Figure 3:
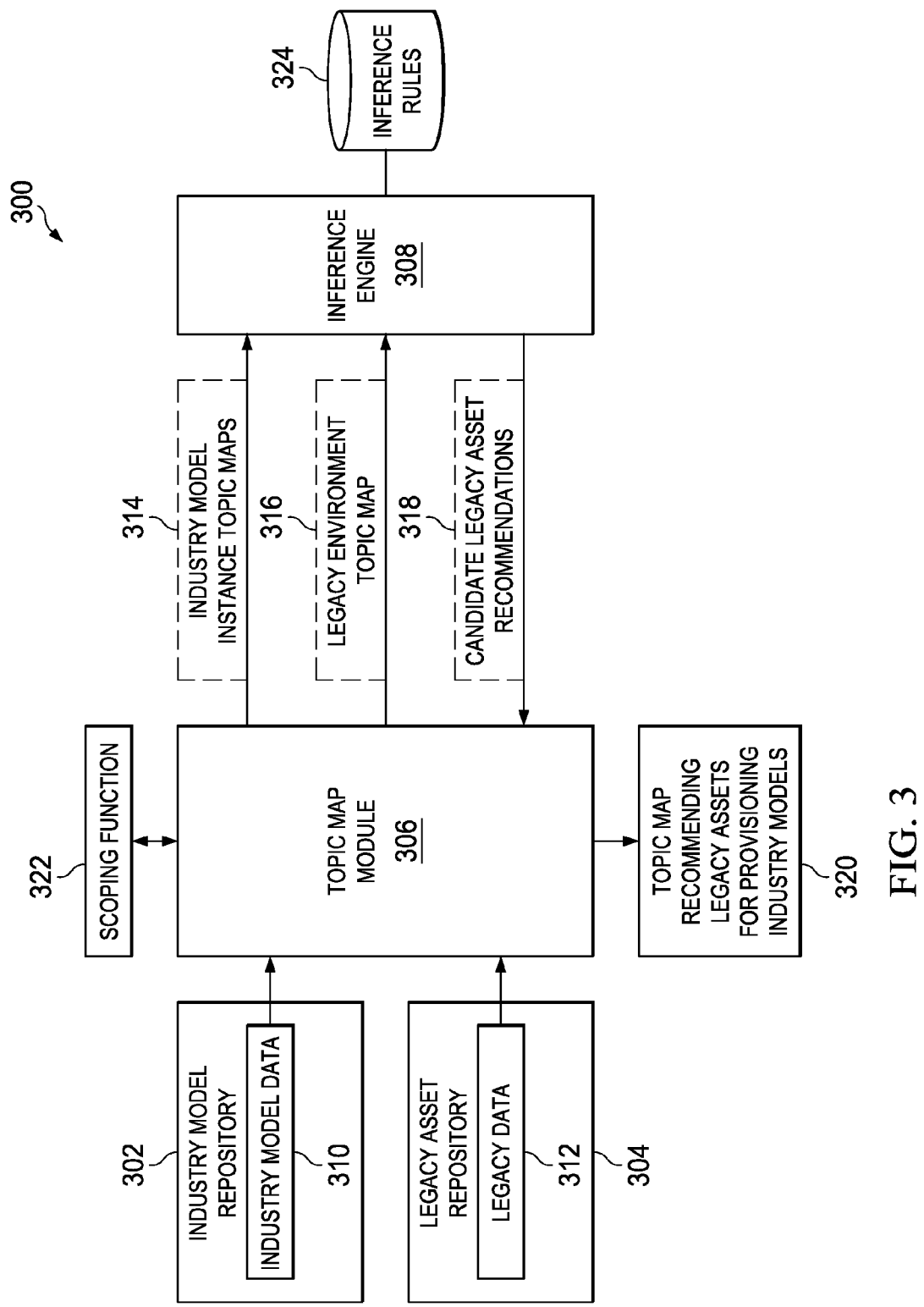
FIG. 3 is an exemplary illustration of a mapping system in accordance with an illustrative embodiment.

With reference now to FIG. 3, an exemplary illustration of a mapping system in accordance with an illustrative embodiment is shown. Enterprise application integration system 300 may be implemented in a network of data processing systems, such as network data processing system 100 in FIG. 1. Alternatively, enterprise application integration system 300 may be implemented in a single data processing system, such as data processing system 200 in FIG. 2.

Enterprise application integration system 300 is a data processing system that includes a plurality of software components or modules that enterprise application integration system 300 uses to automatically map industry vertical models to legacy environments in a standard format to suggest points of enterprise application integration. Enterprise application integration system 300 includes industry model repository (IMR) 302, legacy asset repository 304, topic map module 306, inference engine 308, scoping function 322, and inference rules 324. However, it should be noted that enterprise application integration system 300 is only meant as an example and not intended as a limitation on different illustrative embodiments. In other words, enterprise application integration 300 may include more or fewer components as necessary to accomplish processes of the different illustrative embodiments.

Industry model repository (IMR) 302 comprises selectable enterprise industry models 310 for various industry types, such as the insurance, financial, healthcare, or retail industries. Enterprise industry models include, but are not limited to, business process models, services models, domain models, data models, interface design models, requirements models, use case models, among others. An example of a specific enterprise industry model is IBM® Insurance Application Architecture (IAA). IAA is a set of information, process, and integration models that represent leading practice systems development in the insurance industry. IAA is an architectural blueprint with detailed insurance business content that can be applied to initiatives on an enterprise-wide or specific project basis. IMR 302 may identify relevant industry models 310 based on context to content mapping. For instance, enterprise application integration system 300 provides the appropriate topic map, which is the content, to help solve the problem at hand, which is the context. The context is provided by the scope of the software project and by the functional and non-functional requirements for that software project. The scope of a software project may be determined by the industry, such as, for example, the insurance industry, financial industry, healthcare industry, retail industry, and so on, selected for the software project. In addition, the scope of the software project may be determined by the architectural style, such as, for example, an SOA architectural style, a client/server architectural style, distributed computing architectural style, and so on, selected for the software project, as well as the particular software model, such as a use case.

Based on the context, IMR 302 provides the appropriate topic map that will map the context to the relevant content. For example, for an insurance industry software project, the context may map to content in the IAA model that enables the software engineering of an insurance claim processing system. IMR 302 then sends the relevant industry models 310 to topic map module 306. In one embodiment, IMR 306 may be implemented as a relational database.

Legacy asset repository 304 comprises legacy data 312 collected about the existing (legacy) components in the legacy environment for a particular industry type. The collected legacy data comprises information about legacy components in the system and the relationships among the components discovered in a manual or automated mining process. These legacy components may include existing software applications, middleware, operating systems, and hardware components. The legacy environment is known as a brownfield environment, as the integration of any new service into the environment must take into account the existing legacy components. Legacy asset repository 304 sends legacy data 312 to topic map module 306.

Topic map module 306 comprises a software component for generating topic maps based on the ISO standard. A topic map comprises information using topics that may represent any concept from people, countries, and organizations to software modules, individual files, and events. Associations between the topics within the topic map represent how topics relate to one another. In addition, the topic map maintains occurrences of the topics that represent where the topics may be found, such as a Webpage, a uniform resource locator (URL), or a reference within a book. Thus, topic maps are similar to semantic networks, concept maps, and mind maps. For instance, a legacy topic generated by topic map module 306 may comprise three main pieces of information—the name of the legacy components, the connections of the legacy components to each other, and also the occurrences of the legacy components (which maps to their physical existence on the deployment network).

Topic map module 306 generates a topic map for industry model instance data 310 received from IMR 302 and a topic map for legacy data 312 received from legacy asset repository 304. In one embodiment, the topic maps may be built utilizing a semantic web tool called Protégé. Protégé is a free, open source ontology editor and knowledge-base framework. Protégé allows the topic maps to be built and/or modified using a variety of formats, including Resource Description Frameworks (RDFs) and Web Ontology Language (OWL). RDF is a language for representing information about resources in the World Wide Web. An RDF ontology may include descriptions about web resources in the form of subject-predicate-object expressions, called 'triples' in RDF terminology. The subject denotes the resource, and the predicate denotes traits or aspects of the resource and expresses a relationship between the subject and the object. OWL is a language that may represent entity-relationship models and constraints. An OWL ontology may include descriptions of classes, along with their related properties and instances. OWL may be designed for use by applications that need to process the content of information and facilitates greater machine interpretability of web content by providing additional vocabulary along with formal semantics. Both RDF and OWL describe information in a formal way that a machine can understand, while topic maps describe the information in a way that humans can understand. Topic map module 306 sends industry model instance topic map 314 and legacy environment topic map 316 to inference engine 308.

Topic map module 306 may also use scoping function 322 that enables a user to define topics comprising a certain scope. A scope is a subset of topics in a repository that are applicable to a particular task or in a particular context. A data repository, such as a model repository, may comprise a large number of scopes, including, for example, models for insurance, finance, retail, deployment, enterprise, etc. All of the models may reside the same repository, but each model has a different scope. For instance, all models comprising a financial context would be in one scope, all the models comprising a retail context would be in another scope, and so on. Consequently, even though there is a large subset of information in the repository, the topic map allows for viewing the information in terms of the subset of relevant information for a particular task or in a particular context. Scoping allows for viewing a subset of information relevant at that time in that context. Scoping may be used to reduce the number of topics to a subset of relevant topics for processing by inferencing engine 308.

Inference engine 308 is a rules engine used to suggest or infer points of integration between the legacy environment and the industry model instance data. These points of integration define relationships or connections among topics represented in the topic maps. In one embodiment, inference engine 308 may, for example, be a commercially available product, such as Agent Building and Learning Environment (ABLE), which is available from the IBM Corporation. ABLE is a Java™ framework, component library, and productivity tool kit for building intelligent agents using machine learning and reasoning. The ABLE framework provides a set of Java™ interfaces and base classes used to build a library of JavaBeans™ called AbleBeans. Java and all Java-based trademarks and logos are trademarks of Sun Microsystems, Inc. in the United States, other countries, or both. The library includes AbleBeans for reading and writing text and database data, for data transformation and scaling, for rule-based inferencing using Boolean and fuzzy logic, and for machine learning techniques, such as neural networks, Bayesian classifiers, and decision trees. Rule sets created using the ABLE Rule Language may be used by any of the provided inference engines, which range from simple if-then scripting to light-weight inferencing to heavy-weight artificial intelligence (AI) algorithms using pattern matching and unification.

Inference engine 308 provides the ability to automatically apply a set of inference rules derived from information about a particular industry vertical to the selected industry model instance topic map 314 and legacy environment topic map 316 received from topic map module 306 to map relationships between the legacy environment and the industry model instance data. These mapped relationships comprise recommendations of candidate legacy assets 318 that may be used to provision the instantiation of the relevant industry models by leveraging machine learning and reasoning. Legacy assets may include software applications, middleware, operating systems, and hardware components in the legacy environment.

Connections between topics across repositories may be created in one of three ways. First, an inferred connection or relationship between topics may be created explicitly, such as, by a user who assigns a connection between a topic in, for example, repository A and another element in repository B. Second, an explicit connection may also be created by an application (in this case, an overseeing computer program) which uses historical information of previously assigned relationships to assign a connection between topics. This historical information may be obtained from a database of previous instances of inter-repository topic connections. Third, an inferred connection or relationship between topics may also be created implicitly by an application using inference engine 308 to infer new connections or relationships between topics. Inference engine 308 uses a set of inference rules 324 based on the domain knowledge for a particular industry vertical.

Each topic is assigned a tag that describes an attribute of the topic. The topic (subject), associated tag (object), and the relationship between the topic and tag (predicate) form a subject-predicate-object expression, or triplet in RDF terminology. The inference engine examines the triplets in the topic maps to determine if the engine can create inferences between triplets to create new connections across topic maps (and repositories).

An inference probability score may also be assigned to a created inference to indicate the probability that topic A in repository A is actually connected to topic B in repository B. In the first case above, a user instructs that a connection between topic A in repository A with topic B in repository B be created. In this example, inference engine 308 may assign an inference probability score of 100% between topic A and topic B, as the topic in repository A is definitely connected to the topic in repository B based on the user input. In the second case above, inference engine 308 may use prior historical information to create inferences between topics. For example, topic A (a service) in repository A has been assigned a connection to topic B (a legacy asset) in repository B in 15 out of 20 service engagements. In other words, the particular legacy asset has been used to implement the particular service 15 out of 20 times. In this example, inference engine 308 may assign an inference probability score of 75%, as there is a 75% probability that if topic A is in repository A and topic B is in repository B, topic A and topic B are connected based on historical service engagement data. In the third case above, inference engine 308 does not utilize historical data to infer connections or relationships, but rather infers new connections between topics based on a probability. For example, if topic A in repository A is surrounded by topics similar to the topics surrounding topic B in repository B, inference engine 308 may infer that there is a probable connection between topic A in repository A and topic B in repository B. The probability that topic A is related to topic B may be determined by inference engine 308 by a number of factors, such as the number of similar topics that surround both topic A and topic B.

It should be noted that inference engine 308 may also use Bayesian probabilities, which are adaptive probabilities that specify some prior probabilities that may be updated in light of new relevant data. In this embodiment, inference engine 308 may continuously calculate the probabilities based upon previous experience depending upon if another tag is added to or removed from a topic.

Once inference engine 308 applies the inference rules to industry model instance topic map 314 and legacy environment topic map 316 and provides recommendations of candidate legacy assets 318 that may be used to implement aspects of the relevant industry models, topic map module 306 retrieves the recommended legacy asset candidate information and generates a topic map using the industry model instance topic map 314, and legacy environment topic map 316, and the recommended candidate legacy assets 318. Topic map 320 provides a graphical representation that enables the enterprise architect to visualize the interrelationships between the industry model instance topic map 314 and legacy environment topic map 316, as well as the points of integration represented by the candidate legacy assets 318 recommended to implement particular aspects of the industry models.

Figure 4:
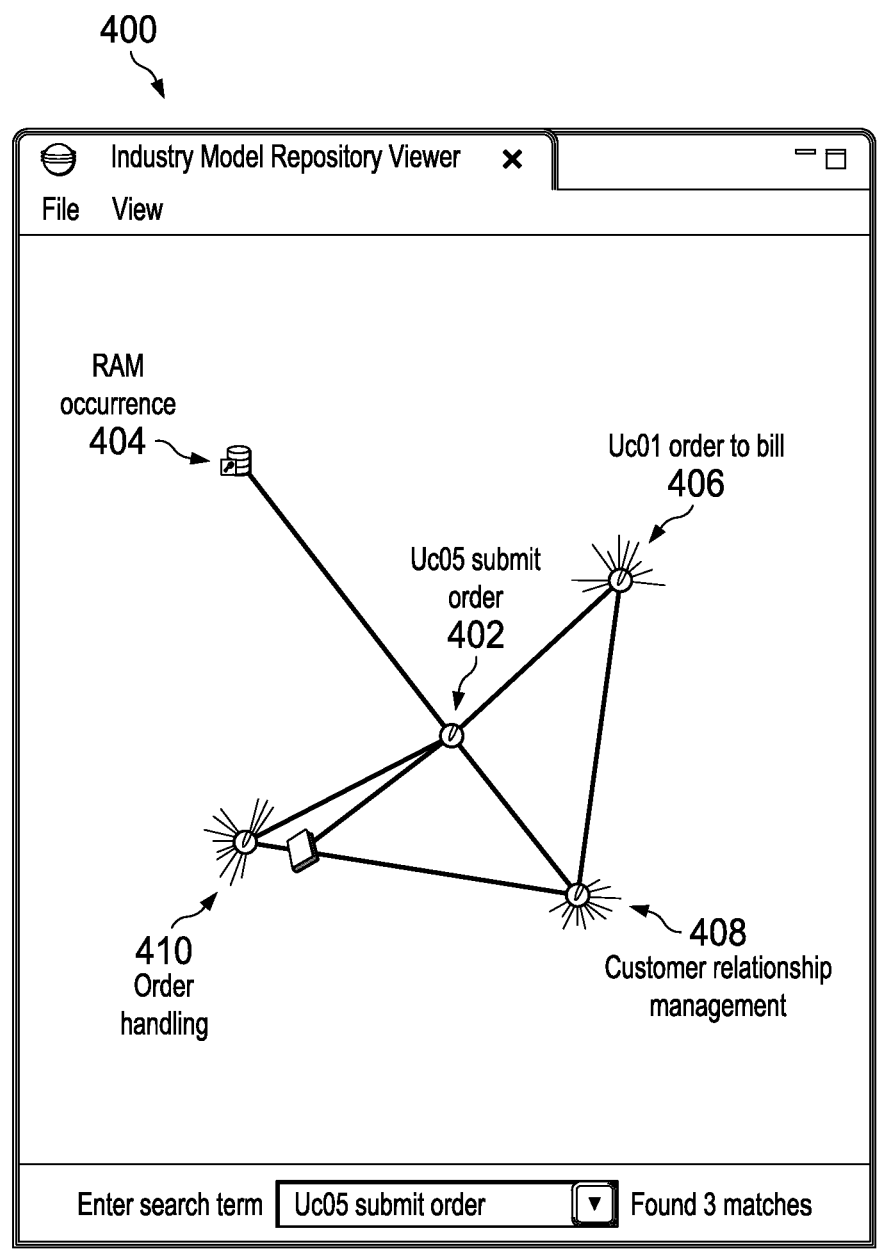
FIG. 4 is an exemplary illustration of a topic map based on industry model data in accordance with an illustrative embodiment.

FIG. 4 is an exemplary illustration of a topic map based on industry model data in accordance with an illustrative embodiment. A topic map comprises a representation of knowledge consisting of a graph of topics, associations, and occurrences. Topics may represent any concept, including people, countries, and organizations to software modules, individual files, and events. Associations represent the relationships between the topics. Occurrences represent information resources that are relevant to the topics in some way.

Industry model topic map 400 is a visual representation of enterprise industry model instance data in a common standard based format. Industry model topic map 400 may be used to represent all industry model data in IMR 302 in FIG. 3 or a selected portion of the industry model data. Visualization of the industry model data knowledge base often begins with the selection of a topic or topics that a user wants to learn about. In the simplest cases, this selection may be accomplished by the user naming a topic. This selection may be performed by the user entering a word or phrase into a topic-search engine. The visualization interface then displays a map of the area of topic space the user selects. In this illustrative example, the user has entered the phrase "Uc05 submit order" into the topic-search engine to generate industry model topic map 400. Industry model topic map 400 comprises several topics based on the search criteria and as derived from enterprise industry model instance data 310 in FIG. 3. Topics include use case 5 (Uc05) submit order 402, RAM occurrence 404, use case 1 (Uc01) order to bill 406, customer relationship management 408, and order handling 410. Use case 5 submit order 402 is shown to have a relationship with each of RAM occurrence 404, use case 1 order to bill 406, customer relationship management 408, and order handling 410. Customer relationship management 408 is also shown to have a relationship use case 1 order to bill 406 and order handling 410.

Figure 5:
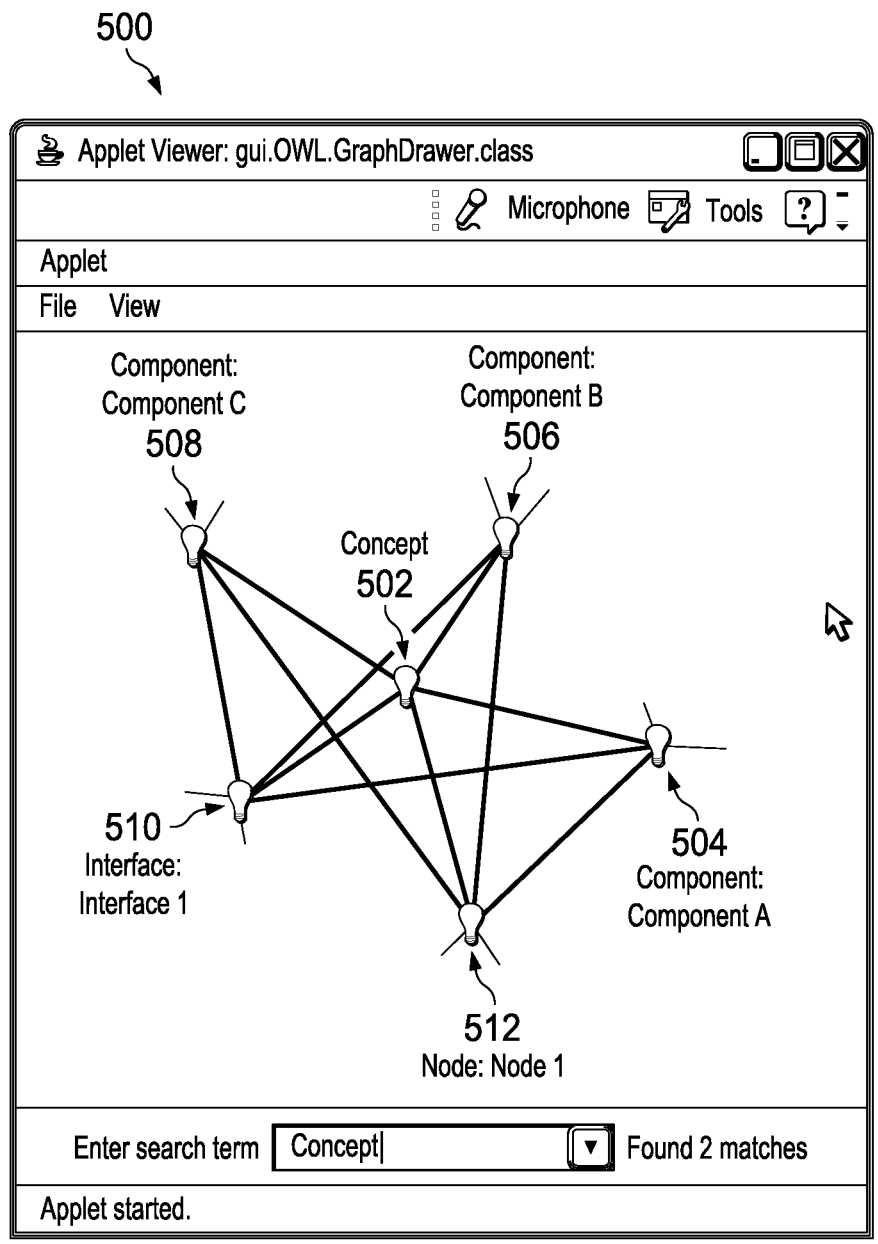
FIG. 5 is an exemplary illustration of a topic map based on legacy environment data in accordance with an illustrative embodiment.

FIG. 5 is an exemplary illustration of a topic map based on legacy environment data in accordance with an illustrative embodiment. Legacy asset topic map 500 is a visual representation of enterprise legacy data in a common standard based format. All of the legacy assets in the legacy environment may be modeled, using brownfield terms, as concepts. Entering the term "concept" into the topic-search engine generates brownfield or legacy asset topic map 500. Legacy asset topic map 500 may be used to represent all of the legacy assets in the legacy environment or a selected portion of the assets in the legacy environment.

In this illustrative example, legacy asset topic map 500 is shown to comprise several topics of different types based on the search criteria and as derived from enterprise legacy data 312 in FIG. 3. Topics include various concept types, including concept 502, component A 504, component B 506, component C 508, Interface 1 510, and Node 1 512. Each concept in the topic map is shown to be associated with one or more other concepts in legacy asset topic map 500. For example, component C 508 may be a legacy asset that comprises a billing system used by a telecommunications company. Component C 508 is shown to be associated with legacy asset Interface 1 510. For instance, component C 508 may utilize Interface 1 510 to expose an interface of service contracts to be referenced by the billing system. Component C 508 and Interface 1 510 are also associated with Node 1 512, as Interface 1 510 may run on a machine or server Node 1 512.

Figure 6:
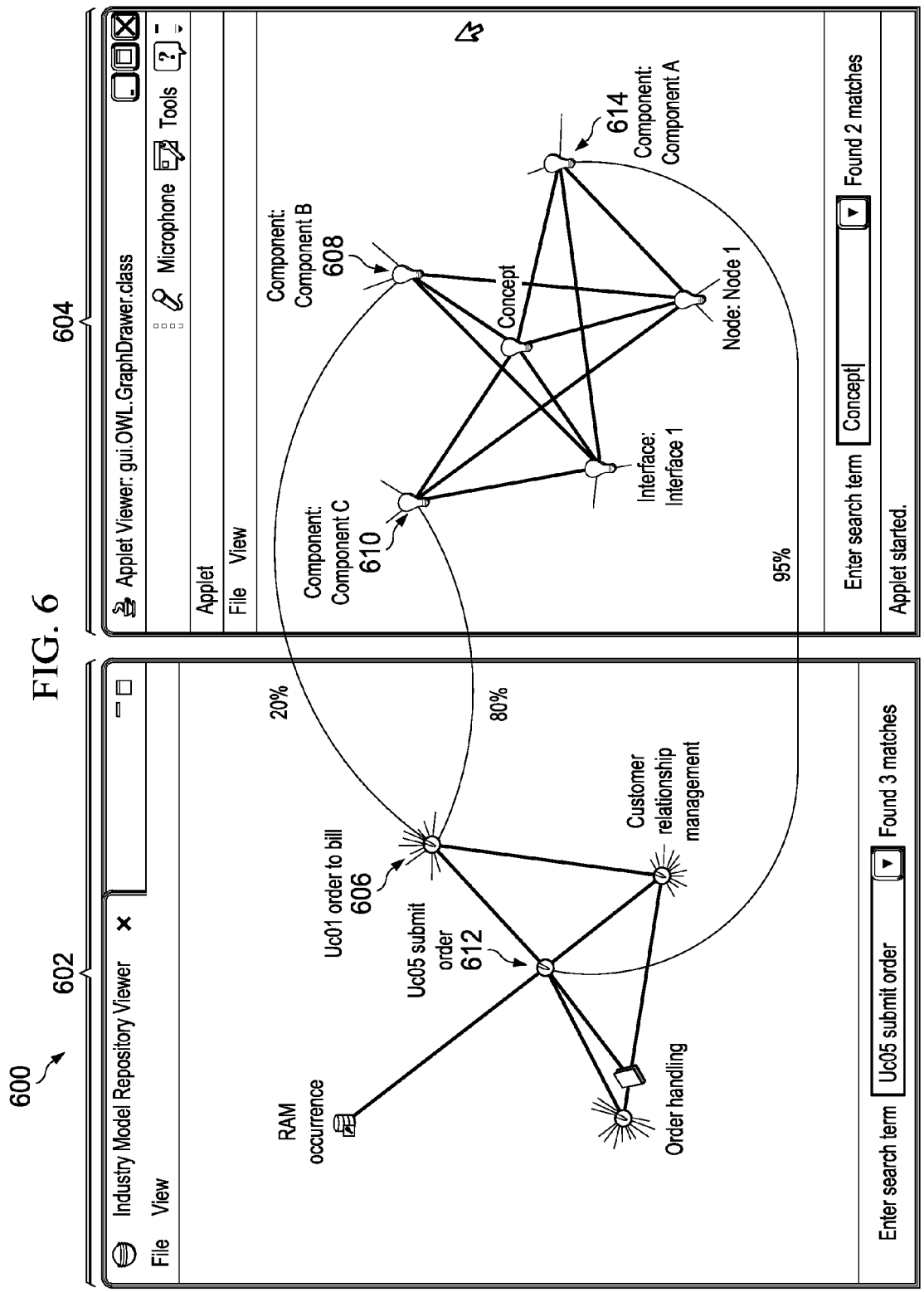
FIG. 6 is an exemplary topic map illustrating the mapping of an industry model data topic map to a legacy environment topic map in accordance with an illustrative embodiment.

FIG. 6 is an exemplary topic map illustrating the mapping of an industry model data topic map to a legacy environment topic map in accordance with an illustrative embodiment. Topic map 600 illustrates the interrelationships between industry model topic map 400 in FIG. 4 and legacy asset topic map 500 in FIG. 5. Topic map 600 may be generated using a set of inference rules based on domain knowledge based on the particular industry associated with the legacy environment. The inference rules derived from the industry model data are applied by RDF inference engine 308 in FIG. 3 to the legacy data described in the OWL ontology to suggest a mapping of the legacy environment applications that may be used to provision the instantiation of the industry model(s). This mapping may be displayed graphically in topic map 600. A visual inspection and comparison of the suggested mapping in topic map 600 may then be performed by the enterprise architect to determine where to maximize the investment around the points of integration through the reuse of legacy assets to implement aspects of the industry models.

Topic map 600 comprises two domains—the first domain comprises the industry model domain 602, and the second domain comprises the brownfield domain 604. Topic map 600 illustrates a probability of mapping from one domain to another. In this illustrative example, inference engine 308 in FIG. 3 has determined that use case 1 (Uc01) order to bill 606 is shown to have a 20% probability of being implemented by component B 608, and an 80% probability of being implemented by component C 610. Similarly, use case 5 (Uc05) submit order 612 is shown to have a 95% probability of being implemented by component A 614. Thus, the enterprise architect may utilize topic map 600 to identify that legacy asset component C 610 may be a candidate for implementing industry standard process use case 1 (Uc01) order to bill 606. Likewise, topic map 600 allows the enterprise architect to identify that component A 614 may be a candidate for implementing industry standard process use case 5 (Uc05) submit order 612.

Figure 7A:
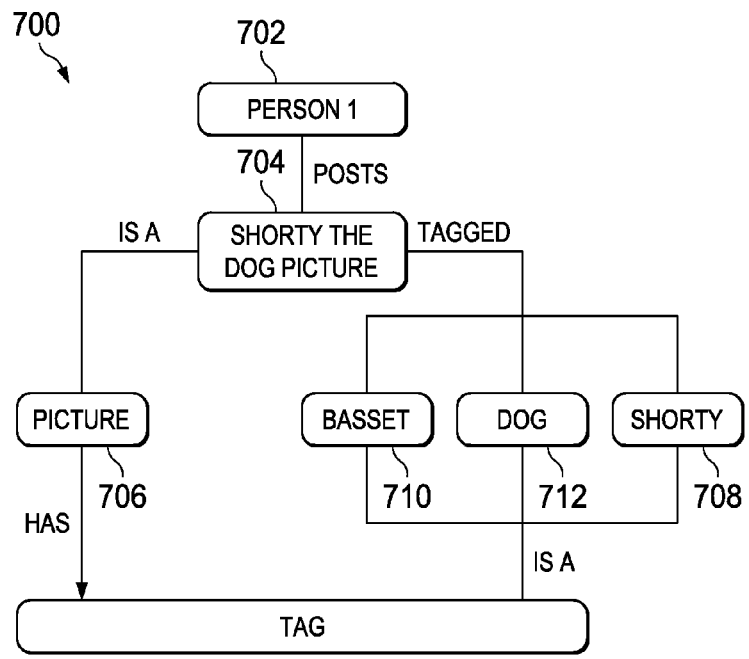
FIGS. 7A-7C illustrate an example of how connections between data stored in one repository and represented by a first topic map and data stored in another repository and represented by a second topic map may be inferred in accordance with an illustrative embodiment.
Figure 7B:
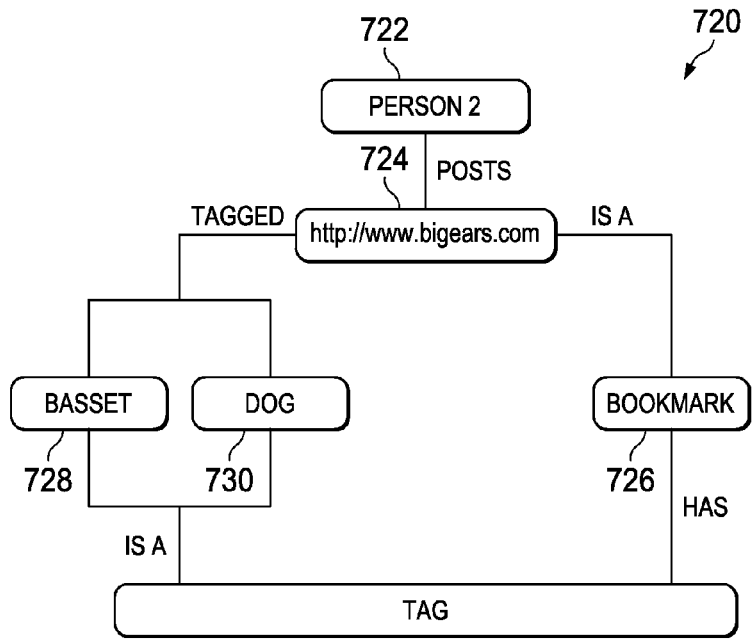
Figure 7C:
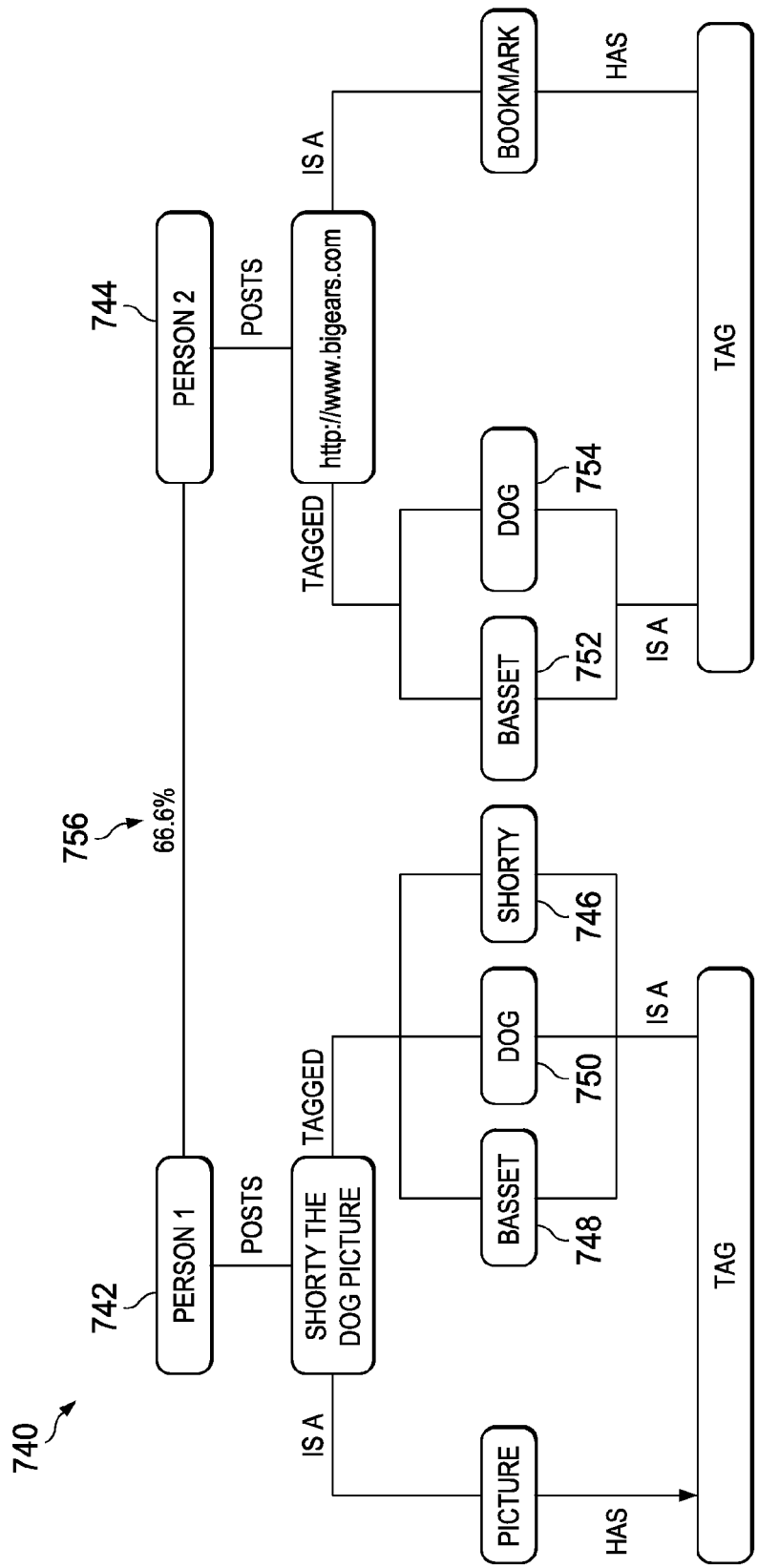

FIGS. 7A-7C illustrate a simple example of how connections between data stored in one repository and represented by a first topic map and data stored in another repository and represented by a second topic map may be inferred in accordance with an illustrative embodiment. These connections may be inferred using an inference engine, such as inference engine 308 in FIG. 3. Although the illustrative example in FIGS. 7A-7C is described in terms of inferring a connection between two people, this illustrative example may be applied equally well to creating inferred connections between topics in one or more repositories. These repositories may include, for example, industry model repository 302 and legacy asset repository 304 in FIG. 3 comprising industry model and legacy asset related topics.

FIG. 7A illustrates an exemplary topic map 700 created by topic map module 306 in FIG. 3 from a first repository (repository A). Repository A is a storage location in which users may store and post photos. A user (Person 1 702) posts Shorty the dog picture 704 to repository A, which is specified as a picture 706 of the user's dog. The user also attaches the following tags to picture 704—Shorty 708 (name of the dog), basset 710, and dog 712. In this example, all of the associations 708-712 are weighted at 100% probability, as there is no uncertainty in these relationships.

FIG. 7B illustrates another exemplary topic map 720 created by topic map module 306 in FIG. 3 from a second repository (repository B). Repository B is a storage location in which users may store and tag bookmarks. A user (Person 2 722) posts a bookmark "bigears.com" 724 to repository B, which is specified as a bookmark 726. The user also attaches the following tags to bookmark bigears.com 724—basset 728 and dog 730. In this example, all of the associations 728 and 730 are again weighted at 100% probability, as there is no uncertainty in these relationships.

FIG. 7C illustrates an exemplary topic map illustrating how relationships between topic maps may be inferred in accordance with an illustrative embodiment. Topic map 740 illustrates the interrelationship between topic map 700 in FIG. 7A and topic map 720 in FIG. 7B. Topic map 740 may be generated using a set of inference rules applied by inference engine 308 in FIG. 3 to the repository data to infer connections between topics in one domain (e.g., photo model domain repository A) and topics in another domain (bookmark model domain in repository B), as well as the probability score of these inferred connections.

To infer relationships between topics in repository A and repository B comprising different domains, a rule is created and used by the inference engine to examine the tags surrounding a topic. The tag examination may comprise determining how many tags are associated with a topic, and how many of the tags associated with a topic match (are the same as) other tags associated with topics in another repository. Based on this tag examination, the inference engine determines whether a topic can be mapped in one repository to a topic in another repository. In this simple example, the inference engine may determine whether the topic Person 1 742 in repository A and the topic Person 2 744 in repository B are related (i.e., the same person). The inference engine detects that Person 1 742 has placed an item into repository A with 3 tags—Shorty 746, basset 748, dog 750, and that Person 2 744 has placed an item into repository B with 2 tags—basset 752, dog 754. The inference engine uses the rule to determine that two of the tags (basset 752, dog 754) from the item provided by Person 2 744 in repository B matches two of the three tags (basset 748, dog 750) from the item provided by Person 1 in repository A. Thus, as Person 1 742 is posting pictures in repository A and using a similar set of tags as Person 2 744 posting bookmarks in repository B, the inference engine may calculate the probability of how connected the Person 1 and Person 2 topics are based upon the number of tag matches for the topic. Since two out of the three tags of Person 1 742 are matched to the tags of Person 2 744, the inference engine may infer that Person 1 742 is related to Person 2 744 with a probability of 66.6% and create an association 756 specifying this probability between Person 1 742 and Person 2 744. A user viewing the intersected topic map 740 may or may not conclude that Person 1 742 and Person 2 744 are the same person based on how high the probability of association 756 is weighted in topic map 740.

Figure 8:
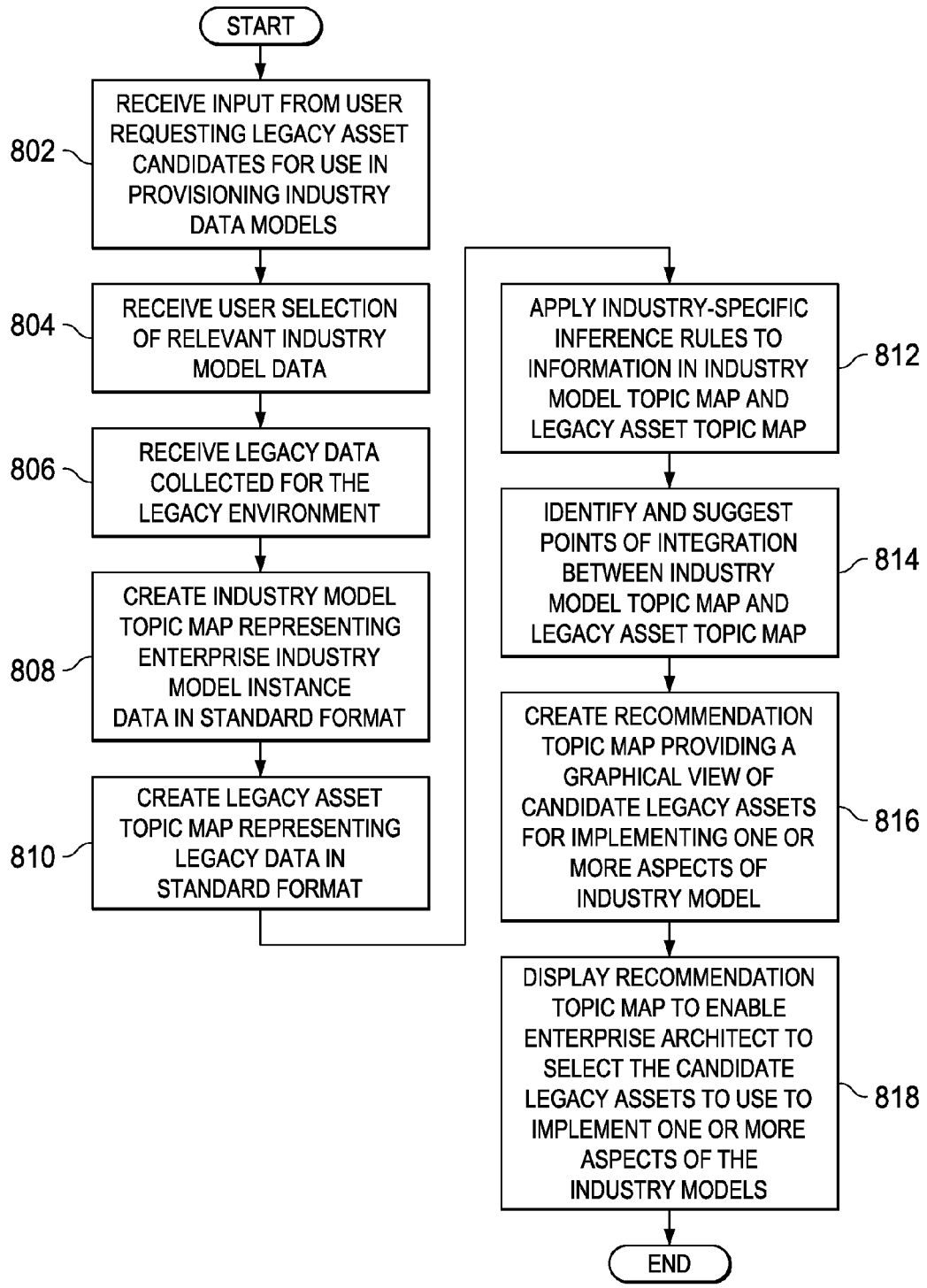
FIG. 8 is a flowchart illustrating an exemplary process for mapping industry vertical models to legacy environments in a standard format in accordance with an illustrative embodiment.

FIG. 8 is a flowchart illustrating an exemplary process for mapping industry vertical models to legacy environments in a standard format in accordance with an illustrative embodiment. The process shown in FIG. 8 may be implemented in enterprise application integration system 300 in FIG. 3.

The process begins when the enterprise application integration system receives an input from a user, such as an enterprise architect, requesting legacy asset candidates for use in provisioning industry data models (step 802). After receiving the input to generate such a mapping in step 802, the enterprise application integration system receives a selection by the enterprise architect of relevant enterprise industry model data, such as industry model data 310 in FIG. 3, for use in the requested mapping recommendations (step 804). In addition, the enterprise application integration system also receives legacy data, such as legacy data 312 in FIG. 3, collected about assets in the legacy (brownfield) environment (step 806).

A topic map module, such as topic map module 306 in FIG. 3, retrieves the relevant enterprise industry model data and creates an industry model topic map representing the enterprise industry model instance data in a standard format (step 808). The topic map module also retrieves the legacy data for the enterprise legacy environment and creates a legacy asset topic map representing the legacy data in a same standard format as the industry model topic map (step 810).

Once topic maps for both the enterprise industry model data and the legacy data have been created, an inference rules engine retrieves the industry model topic map and the legacy asset topic map and applies a set of industry-specific inference rules to the industry model instance data in the industry model topic map and the legacy asset information in the legacy asset topic map (step 812). The set of industry-specific inference rules may be based on the domain knowledge for the particular industry vertical associated with the legacy environment. Using the applied inference rules, the inference rules engine identifies and suggests points of integration between the industry model topic map and the legacy asset topic map (step 814). The points of integration the industry model topic map and the legacy asset topic map identify candidate legacy assets in the brownfield environment that may be used to implement one or aspects of the industry model(s). The topic map module retrieves the candidate legacy asset recommendations from the inference rules engine and creates a recommendation topic map that provides a graphical view of the candidate legacy assets that may be used to implement one or aspects of the industry model (step 816). The recommendation topic map is displayed to the enterprise architect, who may then utilize the recommendations in the recommendation topic map to select a candidate legacy asset to use to implement one or more aspects of the industry models (step 818). It should be noted that the decision by the enterprise architect to select a particular legacy asset to implement aspects of the industry model may also be used to update the set of rules utilized by inference engine 308 in FIG. 3 for the particular industry model.

The flowchart and block diagrams in the Figures illustrate the architecture, functionality, and operation of possible implementations of systems, methods and computer program products according to various embodiments of the disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the embodiments of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments of the disclosure has been presented for purposes of illustration and description, but is not intended to be exhaustive or limited to the embodiments of the disclosure in the forms disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The embodiments of the disclosure can take the form of an entirely hardware embodiment, an entirely software embodiment or an embodiment containing both hardware and software elements. In a preferred embodiment, the disclosure is implemented in software, which includes but is not limited to firmware, resident software, microcode, etc.

Furthermore, the embodiments of the disclosure can take the form of a computer program product accessible from a computer readable medium providing program code for use by or in connection with a computer or any instruction execution system. For the purposes of this description, a computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters. The description of the embodiments of the disclosure has been presented for purposes of illustration and description, and is not intended to be exhaustive or limited to the embodiments of the disclosure in the forms disclosed. Many modifications and variations will be apparent to those of ordinary skill in the art. The embodiments were chosen and described in order to best explain the principles of the disclosure, the practical application, and to enable others of ordinary skill in the art to understand the disclosure for various embodiments with various modifications as are suited to the particular use contemplated.

What is claimed is:

1. A method for recommending points of integration between an enterprise industry model and a legacy model, the method comprising:
   receiving a user entered first search term for the enterprise industry model;
   electronically searching a first domain of instance data of the enterprise industry model for first nodes matching the first search term;
   generating and displaying a first graphical map that shows one or more first nodes that match the first search term and edges which interconnect the one or more first nodes with other nodes in accordance with relationships defined in the first domain;
   receiving a user entered second search term for the legacy model;
   electronically searching a second domain of instance data of the legacy model for second nodes matching the second search term;
   generating and displaying a second graphical map that shows one or more of the second nodes that match the second search term and edges which interconnect the one or more second nodes with other nodes in accordance with relationships defined in the second domain;
   calculating a probability score representing a probability that a first one of the matching second nodes is capable of implementing the function of a first one of the matching first nodes; and
   graphically indicating a connection between and the probability score for the first one of the matching first nodes and the first one of the matching second nodes.

2. The method of claim 1, wherein said first graphical map includes one or more additional nodes not matching the first search term that are connected to at least one of the first nodes by an edge, wherein said second graphical map includes one or more additional nodes not matching the second search term that are connected to at least one of the second nodes by an edge.

3. The method of claim 1,
   wherein calculating the probability score comprises one or more of:
   (a) determining that a user explicitly indicated a connection between the first one of the second nodes and the first one of the first nodes and responsively setting the probability score to one hundred percent;
   (b) determining from historical information an existence of a plurality of recorded situations in which a map for the first domain includes the first one of the first nodes and in which a map for the second domain includes the first one of the second nodes; computing a first quantity of times representing a sub-quantity of the recorded situations where the first one of the first nodes was connected to the first one of the second nodes; computing a second quantity of times representing a sub-quantity of the recorded situations where the first one of the first nodes was not connected to the second one of the second nodes; and calculating the probability score from the computed first quantity and the computed second quantity; and
   (c) determining the probability score based on a level of similarity that a first set of nodes having an edge to the first one of the first nodes have to a second set of nodes having an edge to the first one of the second nodes.

4. The method of claim 1, wherein the first graphical map is a topic map representation showing a set of first nodes and their interrelationships in accordance with topic map recorded information stored for the first domain, wherein the second graphical map is topic map representation showing a set of second nodes and their interrelationships in accordance with topic map recorded information stored for the second domain.

5. The method of claim 1, further comprising:
   creating the first graphical map from a first topic map;
   creating the second graphical map from a second topic map;
   creating a combined topic map view comprising a representation of a subset of the instance data of the enterprise industry model and a representation of a subset of the instance data of the legacy model, wherein the combined topic map view indicates a relationship between the first one of the first nodes and the first one of the second nodes.

6. The method of claim 5, further comprising:
   applying a set of inference rules against the representation of enterprise industry model and the representation of legacy model by:
      examining tags associated with the first one of the first nodes and tags associated with the first one of the second nodes;
      determining whether the tags associated with the first one of the first nodes match any of the tags associated with the first one of the second nodes;
      responsive to determining a match, creating the relationship between the first one of the first nodes and the first one of the second nodes; and
      assigning the probability score to the relationship.

7. The method of claim 1, wherein the first graphical map, the second graphical map, and the probability score are concurrently shown within a single graphical user interface.

8. An apparatus comprising:
   a bus;
   a storage device connected to the bus, wherein the storage device contains computer readable code;
   a communications unit connected to the bus; and
   a processing unit connected to the bus, wherein the processing unit executes the computer readable code to:
   receive a user entered first search term for the enterprise industry model;
      electronically search a first domain of instance data of the enterprise industry model for first nodes matching the first search term;
      generate and displaying a first graphical map that shows one or more first nodes that match the first search term and edges which interconnect the one or more first nodes with other nodes in accordance with relationships defined in the first domain;
   receive a user entered second search term for the legacy model;
      electronically search a second domain of instance data of the legacy model for second nodes matching the second search term;
      generate and displaying a second graphical map that shows one or more of the second nodes that match the second search term and edges which interconnect the one or more second nodes with other nodes in accordance with relationships defined in the second domain;

calculate a probability score representing a probability that a first one of the matching second nodes is capable of implementing the function of a first one of the matching first nodes; and graphically indicate a connection between and the probability score for the first one of the matching first nodes and the first one of the matching second nodes.

9. The apparatus of claim 8, wherein said first graphical map includes one or more additional nodes not matching the first search term that are connected to at least one of the first nodes by an edge, wherein said second graphical map includes one or more additional nodes not matching the second search term that are connected to at least one of the second nodes by an edge.

10. The apparatus of claim 8, wherein the processing unit executes the computer readable code to calculate the probability score by one or more of:

calculating the probability score comprises one or more of:
(a) determining that a user explicitly indicated a connection between the first one of the second nodes and the first one of the first nodes and responsively setting the probability score to one hundred percent;
(b) determining from historical information an existence of a plurality of recorded situations in which a map for the first domain includes the first one of the first nodes and in which a map for the second domain includes the first one of the second nodes; computing a first quantity of times representing a sub-quantity of the recorded situations where the first one of the first nodes was connected to the first one of the second nodes; computing a second quantity of times representing a sub-quantity of the recorded situations where the first one of the first nodes was not connected to the second one of the second nodes; and calculating the probability score from the computed first quantity and the computed second quantity; and
(c) determining the probability score based on a level of similarity that a first set of nodes having an edge to the first one of the first nodes have to a second set of nodes having an edge to the first one of the second nodes.

11. The apparatus of claim 8, wherein the processing unit further executes the computer readable code to:
create the first graphical map from a first topic map;
create the second graphical map from a second topic map;
creating a combined topic map view comprising a representation of a subset of the instance data of the enterprise industry model and a representation of a subset of the instance data of the legacy model, wherein the combined topic map view indicates a relationship between the first one of the first nodes and the first one of the second nodes.

12. The apparatus of claim 11, wherein the processing unit further executes the computer readable code to apply a set of inference rules against the representation of enterprise industry model and the representation of legacy model by:
examining tags associated with the first one of the first nodes and tags associated with the first one of the second nodes;
determining whether the tags associated with the first one of the first nodes match any of the tags associated with the first one of the second nodes;
responsive to determining a match, creating the relationship between the first one of the first nodes and the first one of the second nodes; and
assigning the probability score to the relationship.

13. The apparatus of claim 8, wherein the first graphical map, the second graphical map, and the probability score are concurrently shown within a single graphical user interface.

14. A computer program product for recommending points of integration between an enterprise industry model and a legacy environment, the computer program product comprising:

a non-transitory computer readable storage device storing computer readable program code the computer readable program code comprising:

computer readable program code for receiving a user entered first search term for the enterprise industry model;

computer readable program code for searching a first domain of instance data of the enterprise industry model for first nodes matching the first search term;

computer readable program code for generating and displaying a first graphical map that shows one or more first nodes that match the first search term and edges which interconnect the one or more first nodes with other nodes in accordance with relationships defined in the first domain;

computer readable program code for receiving a user entered second search term for the legacy model;

computer readable program code for searching a second domain of instance data of the legacy model for second nodes matching the second search term;

computer readable program code for generating and displaying a second graphical map that shows one or more of the second nodes that match the second search term and edges which interconnect the one or more second nodes with other nodes in accordance with relationships defined in the second domain;

computer readable program code for calculating a probability score representing a probability that a first one of the matching second nodes is capable of implementing the function of a first one of the matching first nodes; and computer readable program code for graphically indicating a connection between and the probability score for the first one of the matching first nodes and the first one of the matching second nodes.

15. The computer program product of claim 14, wherein said first graphical map includes one or more additional nodes not matching the first search term that are connected to at least one of the first nodes by an edge, wherein said second graphical map includes one or more additional nodes not matching the second search term that are connected to at least one of the second nodes by an edge.

16. The computer program product of claim 14, wherein the computer readable program code for calculating the probability score is for one or more of:
(a) determining that a user explicitly indicated a connection between the first one of the second nodes and the first one of the first nodes and responsively setting the probability score to one hundred percent;
(b) determining from historical information an existence of a plurality of recorded situations in which a map for the first domain includes the first one of the first nodes and in which a map for the second domain includes the first one of the second nodes; computing a first quantity of times representing a sub-quantity of the recorded situations where the first one of the first nodes was connected to the first one of the second nodes; computing a second quantity of times representing a sub-quantity of the recorded situations where the first one of the first nodes was not connected to the second one of the second nodes; and calculating the probability score from the computed first quantity and the computed second quantity; and (c) determining the probability score based on a level of similarity that a first set of nodes having an edge to the first one of the first nodes have to a second set of nodes having an edge to the first one of the second nodes.

17. The computer program product of claim 16, wherein the first graphical map is a topic map representation showing a set of first nodes and their interrelationships in accordance with topic map recorded information stored for the first domain, wherein the second graphical map is topic map representation showing a set of second nodes and their interrelationships in accordance with topic map recorded information stored for the second domain.

18. The computer program product of claim 16, wherein the computer readable program code further comprises:
  computer readable program code for creating the first graphical map from a first topic map;
  computer readable program code for creating the second graphical map from a second topic map;
  computer readable program code for creating a combined topic map view comprising a representation of a subset of the instance data of the enterprise industry model and a representation of a subset of the instance data of the legacy model, wherein the combined topic map view indicates a relationship between the first one of the first nodes and the first one of the second nodes.

19. The computer program product of claim 18, wherein the computer readable program code further comprising:
  computer readable program code for applying a set of inference rules against the representation of enterprise industry model and the representation of legacy model by:
    examining tags associated with the first one of the first nodes and tags associated with the first one of the second nodes;
    determining whether the tags associated with the first one of the first nodes match any of the tags associated with the first one of the second nodes;
    responsive to determining a match, creating the relationship between the first one of the first nodes and the first one of the second nodes; and
    assigning the probability score to the relationship.

20. The computer program product of claim 14, wherein the first graphical map, the second graphical map, and the probability score are concurrently shown within a single graphical user interface.

* * * * *